United States Patent [19]

Konzal

[11] Patent Number: 5,544,537
[45] Date of Patent: Aug. 13, 1996

[54] ENERGY BALANCE SYSTEM CONFIGURED TO COMPENSATE FOR THE CHANGES IN ENERGY ABSORBED BY A ROTATING SHAFT

[75] Inventor: Daryl R. Konzal, Colgate, Wis.

[73] Assignee: Paper Machinery Corporation, Milwaukee, Wis.

[21] Appl. No.: 184,573

[22] Filed: Jan. 21, 1994

[51] Int. Cl.⁶ ............................ F16H 25/08; F16H 53/06
[52] U.S. Cl. ............................................. 74/53; 74/569
[58] Field of Search ............................... 74/53, 569

[56] References Cited

U.S. PATENT DOCUMENTS

| | | | |
|---|---|---|---|
| 2,543,649 | 2/1951 | Wales et al. | 74/53 |
| 3,413,862 | 12/1968 | Waara | 74/53 |
| 4,301,696 | 11/1981 | Andersson . | |
| 4,334,437 | 6/1982 | Andersson | 74/53 |
| 4,496,130 | 1/1985 | Toyama . | |
| 4,726,253 | 2/1988 | Russell . | |
| 4,796,522 | 1/1989 | Lynch | 74/569 X |
| 4,854,236 | 8/1989 | Thünker et al. . | |
| 4,955,243 | 9/1990 | Kato et al. . | |
| 5,068,565 | 11/1991 | Huang | 74/53 X |

FOREIGN PATENT DOCUMENTS

| | | | |
|---|---|---|---|
| 209266 | 9/1987 | Japan | 74/569 |
| 7310506 | 2/1975 | Netherlands | 74/569 |

*Primary Examiner*—Rodney H. Bonck
*Assistant Examiner*—Mary Ann Battista
*Attorney, Agent, or Firm*—Foley & Lardner

[57] ABSTRACT

An energy balance apparatus includes a drive shaft which experiences torque loads. A properly formed face cam is attached to the shaft and a force is applied against the surface of the face cam via a cam follower. An actuator mechanism is attached to the cam follower to force the cam follower against the cam surface. Also, a release mechanism is connected to the actuator mechanism to selectively release the applied force.

15 Claims, 4 Drawing Sheets

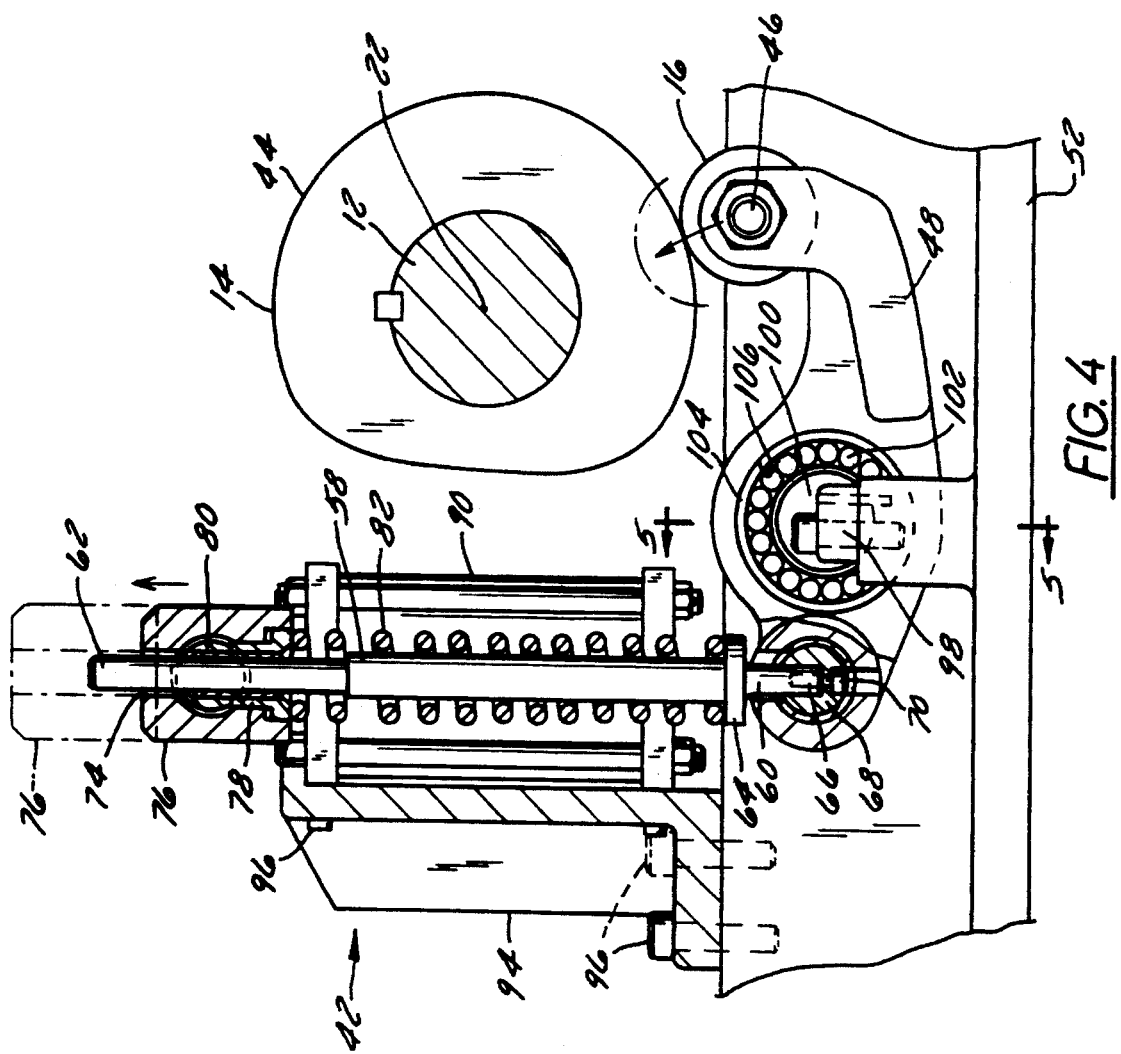
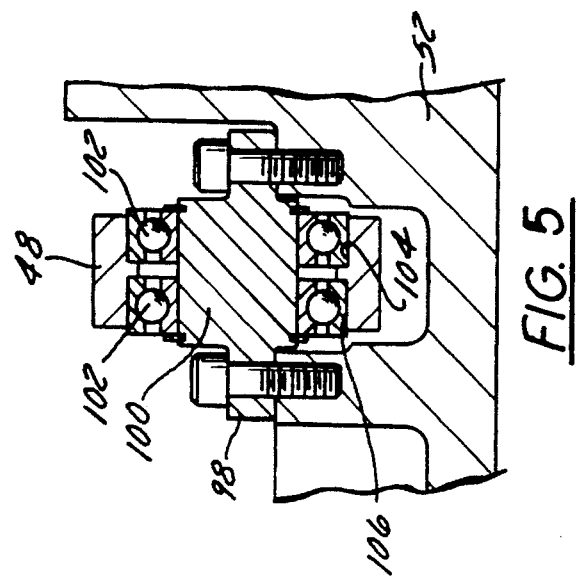

5,544,537

ENERGY BALANCE SYSTEM CONFIGURED TO COMPENSATE FOR THE CHANGES IN ENERGY ABSORBED BY A ROTATING SHAFT

FIELD OF THE INVENTION

The present invention relates generally to an energy balance system for compensating the changes in energy absorbed by a rotating shaft performing work, and particularly to an energy balance system which uses cams to counteract the twisting of a drive shaft due to variable torque loads acting upon it.

BACKGROUND OF THE INVENTION

Many devices and machines use drive shafts to run various power take-off devices. For instance, in turret machines, such as those used to make paper cups and the like, drive shafts run main turrets on which cups are formed, various delivery turrets, and numerous mechanical work stations that perform a variety of cup forming operations. The power take-off devices are connected to the drive shaft by mechanisms such as an indexing roller gear cam, drive sprocket or gear.

The drive shaft of these machines experiences variable torque at each torque load point where a power take-off device is connected to the shaft. This poses a substantial problem under many operating conditions. For instance, where an indexing turret is driven by a roller gear cam mounted on the drive shaft, a varying torque is placed on the shaft each time the turret is accelerated and decelerated during indexing from one position to the next. This can cause an angular twisting of the drive shaft which leads to fatigue and wear on both the drive shaft and the driven components.

Twisting of the shaft also leads to inaccurate operation of the various driven components. This inaccuracy can cause formation of less desirable products. For instance, if a shaft is flexing angularly, portions of the shaft are momentarily running at different angular velocities than other portions of the shaft making it difficult to precisely time the various power take-off devices and work stations. As machines are run at higher and higher speeds, this twisting of shafts and the resultant variation in angular speed along the shaft makes precise alignment of components and timing of procedures increasingly more difficult.

Shaft spring-back after a heavy load or torque is released can also occur. For example, when a heavy turret is accelerated during the first segment of an indexing operation, an increased torque is imposed on the drive shaft. However, after the acceleration is completed and the heavy torque is reduced or eliminated, the shaft tends to spring back and actually twist in the opposite angular direction, again leading to uneven angular velocities throughout the length of the shaft. Nearly any driven component which places varying torques on a shaft will cause twisting and spring-back thereby limiting the accuracy of the driven components. This problem, of course, is amplified when the speed of operation is increased and the resultant torques and spring-backs are also increased.

It would be advantageous to balance the energy absorbed by a given shaft. In such a system, torques acting on a shaft would be counterbalanced to minimize twisting of the shaft and to stabilize the angular velocity of the shaft along its entire length.

SUMMARY OF THE INVENTION

The present invention features an energy balance apparatus comprising a rotatable shaft upon which a torque load may be placed. A cam of predetermined configuration is mounted on the rotatable shaft for rotation therewith. A cam follower acts against the cam to limit twisting of the rotatable shaft due to the torque load. This cam follower is appropriately forced against the cam by a spring loaded actuator mechanism designed to supply a predetermined force load. Additionally, a release mechanism cooperates with the actuator mechanism to reduce or eliminate the predetermined force load.

According to another aspect of the invention, an energy balance system is provided for reducing the torque effects of power take-off devices. In this system, a drive shaft is rotatable about a longitudinal axis and includes a plurality of torque load points which experience variable torques due to the interaction of power take-off devices with the drive shaft. The varying torques cause the shaft to twist.

A plurality of cams are mounted on the shaft and each cam is located at a cam location. Each cam also has a cam surface configured to counteract the twisting of the drive shaft at the corresponding cam location when a sufficient force is applied against the cam surface. A plurality of cam followers cooperate with the cams and at least one cam follower acts against each cam surface. An actuator system is connected to the cam followers to force each cam follower against its corresponding cam surface with a predetermined force load. Additionally, a release mechanism is connected to the actuator system to selectively release the predetermined force load. Thus, the plurality of cams, the plurality of cam followers, and the actuator system cooperate to reduce the overall twisting of the shaft.

DESCRIPTION OF THE DRAWINGS

The invention will hereafter be described with reference to the accompanying drawings, wherein like referenced numerals denote like elements, and:

FIG. 4 is a side elevation view of an alternate embodiment of the energy balance apparatus shown in partial cross-section; and FIG. 5 is a cross-sectional view taken substantially along the line 5—5 of FIG. 4 showing a lever arm pivot.

DETAILED DESCRIPTION OF THE PREFERRED EMBODIMENT

Figure 1:
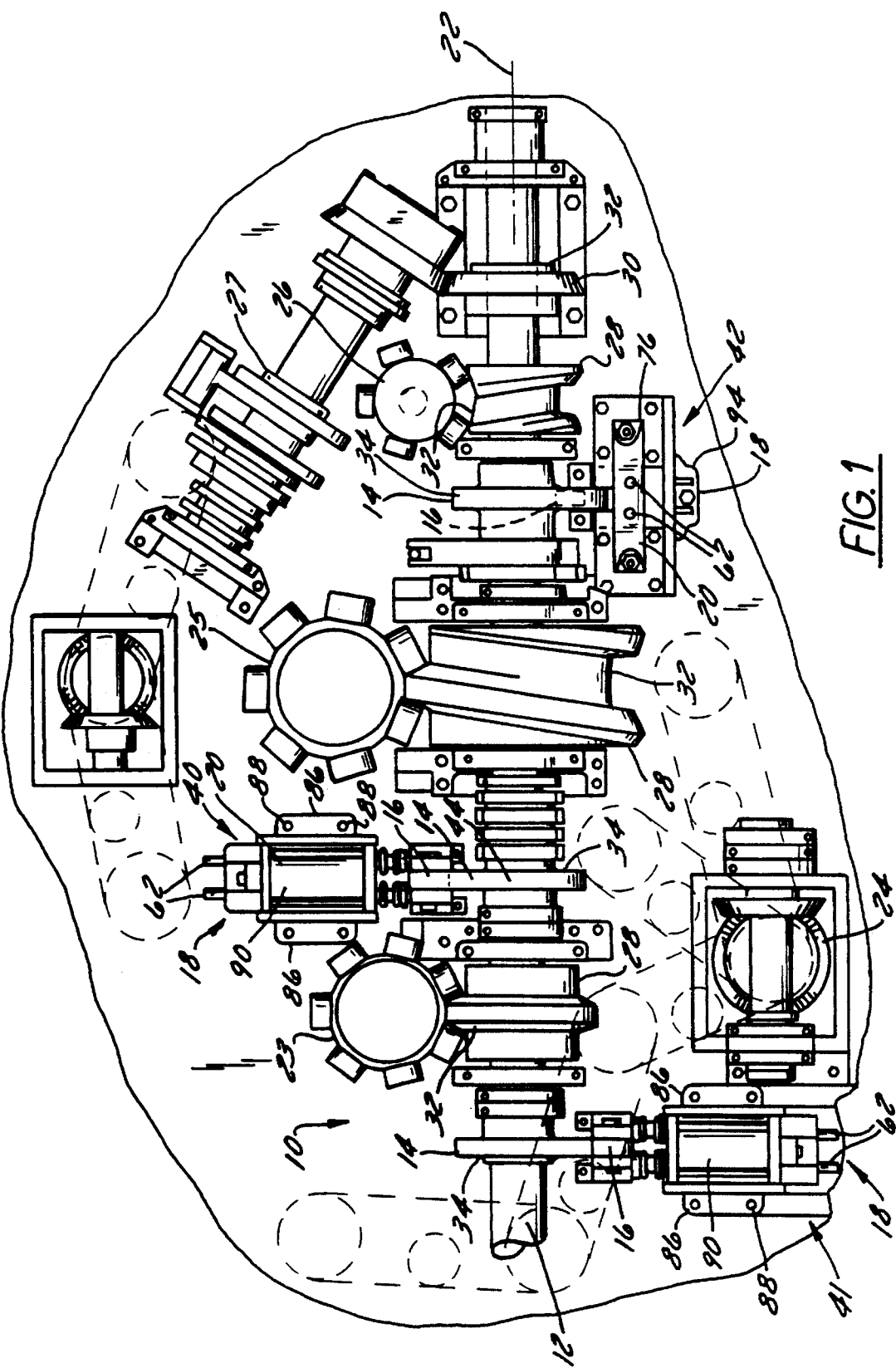
FIG. 1 is an overall schematic view of an energy balance system according to a preferred form of the present invention showing a drive shaft and various power take-off devices.

An energy balance system 10 is illustrated generally in FIG. 1. This illustrated embodiment should not be construed as limiting but as one exemplary configuration of the overall energy balance system. The number of driven components can be increased or decreased, the arrangement of components can be changed, and the mechanisms for converting the rotational movement of a shaft into other types of movement can be changed. However, the illustrated embodiment will be described to facilitate an understanding of how the system works.

Energy balance system 10 includes a shaft 12 which drives various driven components, such as those used in a turret-type cup making machine. The energy balance system 10 also includes a plurality of cams 14 mounted on drive shaft 12, a plurality of cam followers 6, and an actuator system preferably having individual actuator mechanisms 18. The actuator mechanisms 18 are connected to cam followers 16 to force each cam follower against its corresponding cam 14. A release mechanism 20 is also connected to actuator mechanisms 18 to selectively release the force applied by cam followers 16 against cams 14.

Shaft 12 and the attached cams 14 rotate about a longitudinal axis 22. As shaft 12 rotates, it drives the various driven components or power take-off devices designated by reference numerals 23 through 27. These power take-off devices are connected to shaft 12 by a variety of mechanisms, such as roller gear cams 28 connected to power take-off devices 23, 25, and 26, respectively, or a sprocket 30 connected to power take-off device 27. Similarly, power take-off device 24 could be connected to shaft 12 and driven by a variety of mechanisms, such as roller gear cams, sprockets, spur gears, or other devices for converting the rotational motion of shaft 12 into a desired motion for the power take-off device.

Often, the power take-off devices cause variable torques which act against shaft 12. For example, power take-off device 25 may turn an indexing turret which is accelerated and then decelerated by its roller gear cam 28 during each rotation of shaft 12. This acceleration and deceleration sequence initially causes a twisting of shaft 12 in one angular direction, and then as the turret is decelerated, the twisted shaft 12 will spring back and cause an angular twisting in the opposite direction. This twisting of the shaft effectively causes fluctuations or momentary changes in the RPM (revolutions per minute) of shaft 12 at that particular torque load point. High torque loads can also change the overall RPMs of the entire shaft.

A plurality of torque load points 32 exist along shaft 12. Wherever a power take-off device is connected to shaft 12, a torque load point 32 is created and can potentially cause shaft 12 to twist, resulting in uneven radial velocities along shaft 12. In other words, shaft 12 must absorb the changes in energy required by the various power take-off devices. Energy balance system 10 works with shaft 12 to balance this energy absorption and to minimize the twisting of shaft 12 at each torque load point 32.

Shaft twist may be limited by using cams 14 to provide a counter-torque at selected points along shaft 12. Each cam 14 is located at a unique cam location 34 on shaft 12 and is configured so an appropriate force applied against the cam will counteract the twisting of shaft 12 at that particular cam location 34.

To select cams and cam locations, the amount of angular twist experienced by shaft 12 at a first selected point is determined, for example, by summing the torque influences on shaft 12 between the power source driving shaft 12 (not shown) and the first selected point. A cam 14, having a cam profile designed to counteract these torque effects when a sufficient force is applied against the cam, is then attached to shaft 12 at the first selected point, i.e. the first cam location. Between this first cam location and a second cam location, the torque effects of the various power take-off devices are once again determined and another cam 14 is designed with an appropriate cam profile to counteract the twisting of shaft 12 between the first cam location and the second cam location when a sufficient force is applied against that particular cam 14. If the shaft includes additional cam locations, this same determination of angular shaft twist will be made between each successive cam location and the profiles of the cams will be designed accordingly. In the illustrated embodiment of FIG. 1, there are three cam locations 34 with cams 14 appropriately configured to counteract the torque effects of the power take-off devices 23 through 27.

In the embodiment of FIG. 1, the torque effects on shaft 12 are counteracted by an individual energy balance apparatus 40, 41, or 42 located proximate each cam location 34, respectively. Energy balance apparatus 40 and energy balance apparatus 41 are similar in design while energy balance apparatus 42 is slightly different in design. Each type of energy balance apparatus will be described in detail with reference to FIGS. 2–5. However, the number, arrangement, and design of each energy balance apparatus may be adjusted according to the particular application of overall energy balance system 10.

For energy balance system 10 to function properly, each cam 14 is designed according to the parameters of the particular machine to which energy balance system 10 is attached. The parameters, such as torque loads, shaft speed, and orientation of the force load against the cam can vary substantially between different machines. However, proper cam design can be determined by those of ordinary skill in the art once the specific operating parameters of the subject machine are known.

Each cam follower 16 is forced against its corresponding cam 14 in a properly oriented direction and with an appropriately calculated force to counteract the twisting of shaft 12 at a corresponding cam location 34 and at the particular speed with which the machine is operated. Additionally, it is desirable to have release mechanism 20 connected to each force supplying actuator mechanism 18 to selectively lessen or eliminate the force acting against the various cams 14. Otherwise, a relatively large amount of potential energy remains in shaft 12 when shaft 12 is stationary. This potential energy can present a safety problem if it inadvertently rotates the shaft, thereby operating the power take-off devices.

Figure 2:
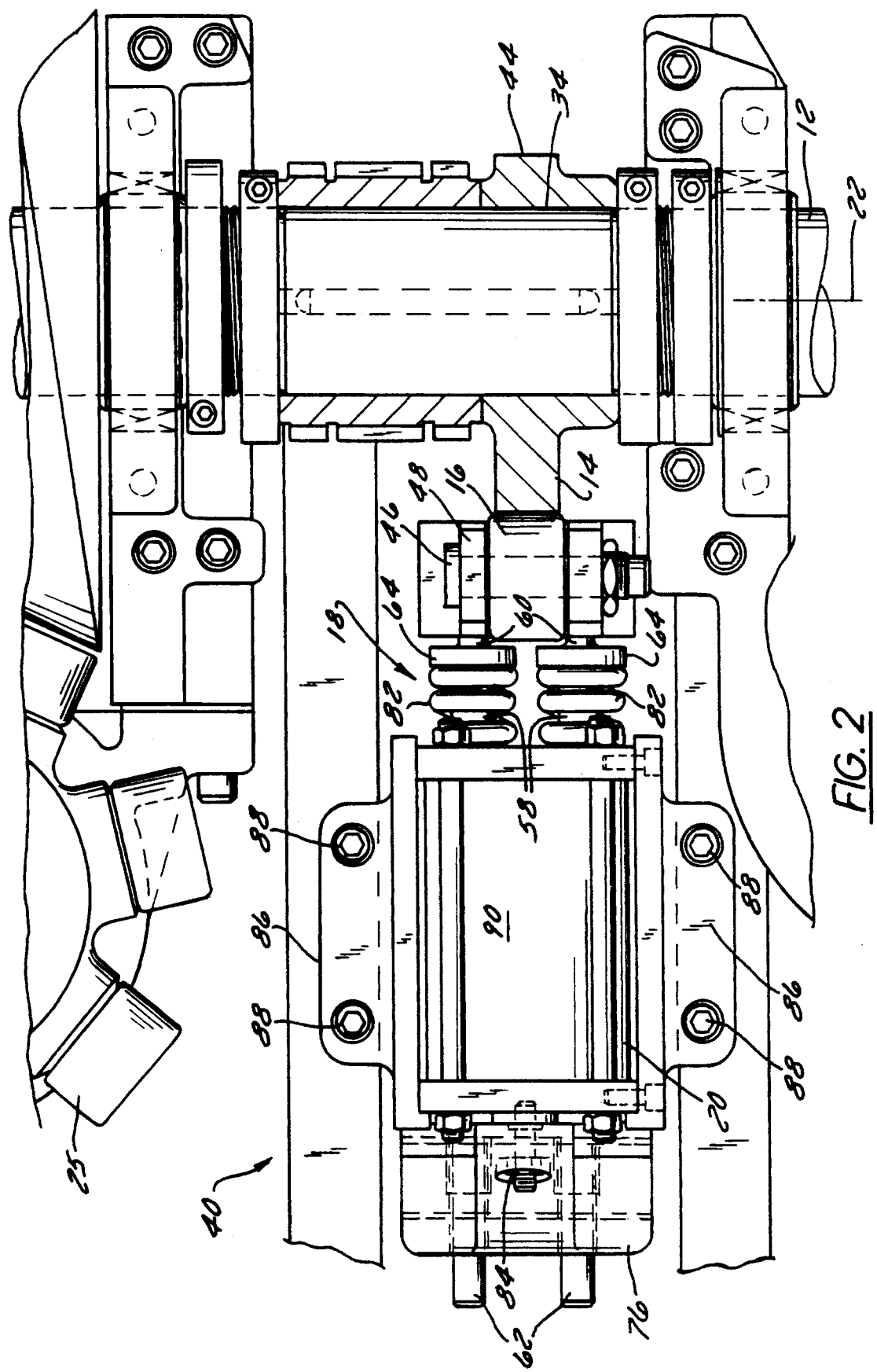
FIG. 2 is a side elevation view of an energy balance apparatus.
Figure 3:
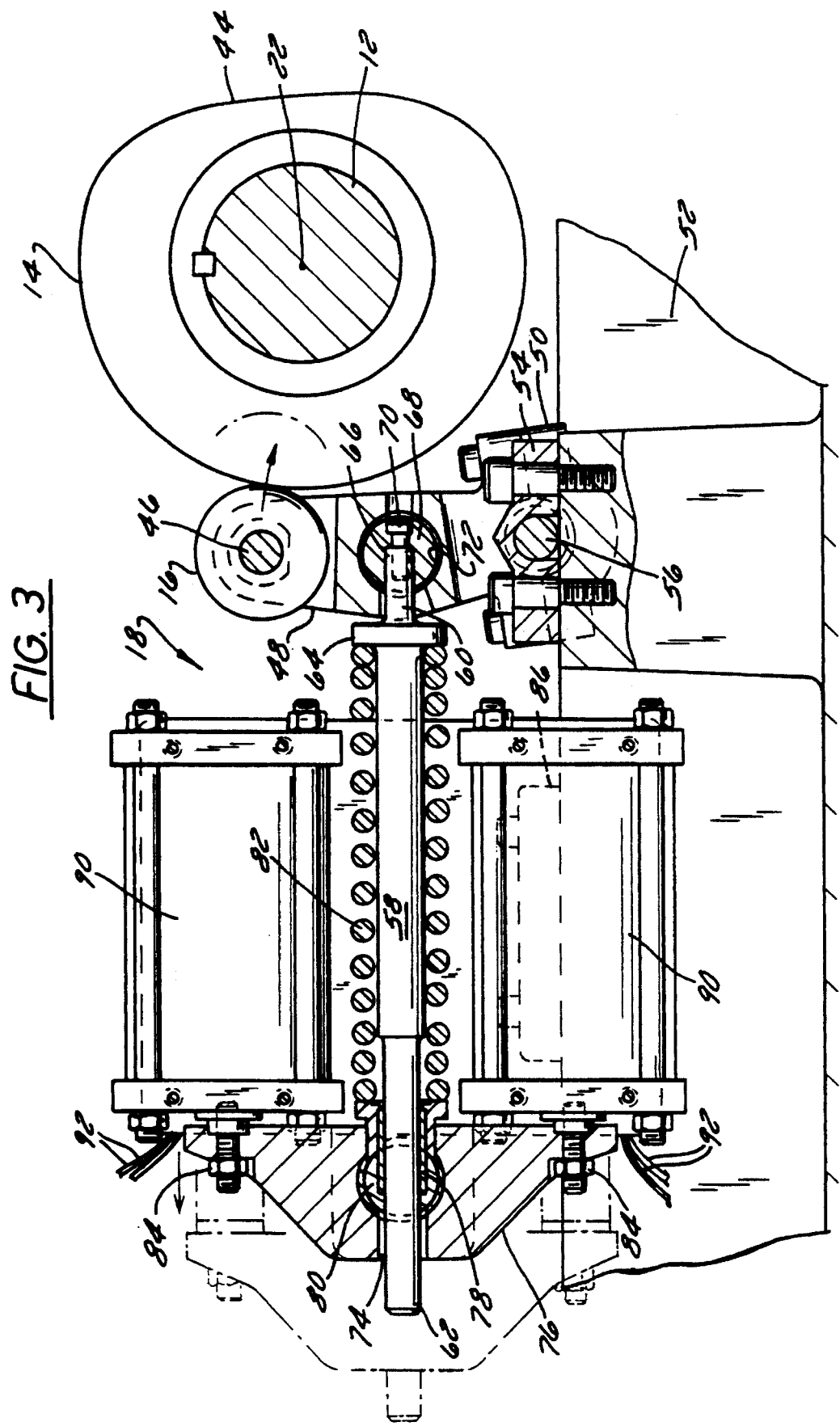
FIG. 3 is a front elevation view of an energy balance apparatus, shown in partial cross-section.

Referring generally to FIGS. 2 and 3, energy balance apparatus 40 is illustrated. Energy balance apparatus 40 generally has the same configuration as energy balance apparatus 41, except the cams 14 and the force applied against the cams may vary. Energy balance apparatus 40 includes cam 14 mounted on rotatable shaft 12. Actuator mechanism 18 forces cam follower 16 against cam 14 with a predetermined force load, and release mechanism 20 cooperates with actuator mechanism 18 to selectively reduce or eliminate the predetermined force load acting against cam 14.

In the preferred embodiment, cam 14 includes a cam surface 44 which extends around shaft 12 for fixed rotation with shaft 12 about longitudinal axis 22. Cam follower 16 is preferably a roller which engages and rolls along cam surface 44 as shaft 12 rotates. Cam follower 16 rotates about a pin 46 by which cam follower 16 is attached to actuator mechanism 18.

Actuator mechanism 18 preferably includes a lever arm 48 having pin 46 disposed at one end and a pivot mounting collar 50 at its opposite end. Pivot mounting collar 50 is pivotably mounted to a framework 52 by a bracket 54 and a pivot pin 56 extending therethrough.

Actuator mechanism 18 further includes a rod 58 and preferably two rods, each having a proximal or first end 60 and a distal or second end 62. Proximal end 60 includes a flange 64 and an attachment portion 66 for connecting each rod 58 to lever arm 48 intermediate pin 46 and pivot pin 56. The proximal end 60 of each rod 58 is preferably connected to a cylindrical bearing 68 by a fastener 70, such as a bolt. Cylindrical bearing 68 is received in a mating cavity 72 disposed in lever arm 48 to allow at least some pivotable motion of each rod 58 with respect to lever arm 48.

The distal end 62 of each rod 58 preferably extends through a bore 74 disposed in a bracket 76. Each distal end 62 also extends through a bushing 78 which is held by a second cylindrical bearing 80 pivotably mounted in bracket 76. Bores 74 are somewhat larger in diameter than the diameter of the corresponding distal end 62 extending therethrough. This allows for at least some pivotable movement of rods 58 and cylindrical bearings 80 with respect to bracket 76. Also, bracket 76 preferably remains at a fixed position when the predetermined force load is applied against the corresponding cam 14.

A spring 82 is disposed intermediate flanges 64 and bracket 76. In the preferred embodiment, there is at least one spring 82 for each rod 58, and each spring may comprise a coil spring longitudinally receiving each rod 58 through the center of the coils as illustrated in FIG. 3. Springs 82 cause cam follower 16 to supply the predetermined force load against cam 14. Each spring 82, acting against its corresponding flange 64, forces lever arm 48 to pivot about a pivot point coaxial with pivot pin 56 causing cam follower 16 to exert the desired force against cam surface 44. Cylindrical bearings 68 and 80 allow rods 58 to pivot slightly with respect to bracket 76 and lever arm 48 during the pivoting of lever arm 48 about pivot pin 56.

Although a preferred embodiment of actuator mechanism 18 has been described with respect to FIGS. 2 and 3, many changes and modifications may be made to the actuating mechanism. For example, a variety of springs or other force producing mechanisms can be used, various numbers of rods 58 can be connected to lever arm 48, lever arm 48 can have a variety of lengths and configurations, and rods 58 can be connected to the lever arm 48 and bracket 76 in a variety of ways. In fact, rods 58 can be connected directly to cam follower 16 to eliminate lever arm 48 for certain applications.

Release mechanism 20 is preferably connected to bracket 76 by a plurality of fasteners 84, such as bolts or weldments, and is also securely connected to framework 52 by one or more mounting brackets 86. Mounting brackets 86 are attached to framework 52 by appropriate fasteners 88, such as bolts or weldments.

Release mechanism 20 also includes at least one pneumatic cylinder 90 and may use two pneumatic cylinders 90, with one disposed on each side of rods 58. The pneumatic cylinders are connected between framework 52 and bracket 76 to selectively move bracket 76 either towards lever arm 48 or away from lever arm 48. When pneumatic cylinders 90 are retracted, bracket 76 moves towards lever arm 48 and forces springs 82 into a compressed state so the predetermined force load may be applied to cam 14 through cam follower 16. However, when the predetermined force load is to be reduced or eliminated, pneumatic cylinders 90 are actuated to an extended state thereby moving bracket 76 generally away from lever arm 48 to release the compression of springs 82 and to reduce the force load against cam 14. The unloaded position is shown in phantom lines in FIG. 3. Pneumatic lines 92 supply pneumatic pressure to cylinders 90 to actuate them between a loaded and unloaded position.

Although pneumatic cylinders are preferred, release mechanism 20 may also be actuated by a number of different mechanisms. These mechanisms include hydraulic cylinders or purely mechanical type devices.

Referring generally to FIGS. 4 and 5, a second embodiment of the energy balance apparatus is illustrated. This particular embodiment is of the type referenced by numeral 42 in FIG. 1 and is particularly desirable where space is limited. Preferably, except for the lever arm 48, actuator mechanism 18, release mechanism 20, cam follower 16, and cam 14 are similar to those used in energy balance apparatus 40 or 41. Accordingly, the similar components will not be described again.

Energy balance apparatus 42 is mounted to framework 52 by a mounting bracket 94 with a plurality of fasteners 96, such as bolts or weldments. The primary difference between the design of energy balance apparatus 42 and that of energy balance apparatus 40 or 41 is the location of the point about which lever arm 48 pivots. In apparatus 42, lever arm 48 is mounted for pivoting motion about a pivot point coaxial with a pivot pin 100. Pivot pin 100 is located intermediate pin 46, to which cam follower 16 is mounted, and cylindrical bearing 68, to which the proximal end 60 of each rod 58 is attached. In the most preferred embodiment, the distance between cylindrical bearing 68 and pivot pin 100 is approximately one-half the distance between pivot pin 100 and pin 46, although these distances can be changed according to the specific application of energy balance apparatus 42. Pivot pin 100 is mounted on a bracket 98 which is attached to framework 52.

In energy balance apparatus 42, cam follower 16 generally acts on a diametrically opposed side of cam 14 when compared to energy balance apparatus 40 or 41. This results from the differently located lever arm pivot point which causes cam follower 16 to apply force in a generally opposite direction from the force imparted by cam follower 16 in energy balance apparatus 40 or 41. The corresponding cam 14 and cam surface 44 are designed to compensate for this generally opposite force direction. As mentioned previously, the embodiment illustrated in FIG. 4 may be particularly advantageous when space is limited.

Lever arms 48 may be pivotably mounted in a variety of ways, but an exemplary bearing arrangement is illustrated in FIGS. 4 and 5. In this configuration, a set of bearings 102, preferably including ball bearings, is disposed in a circular bore 104 extending through lever arm 48. The bearings 102 are disposed intermediate pin 100 and a wall 106 of cavity 104 to facilitate smooth and consistent pivoting of lever arm 48.

Each individual energy balance apparatus 40, 41, and 42 can be used to limit the twisting of a shaft. However, in many applications, it will be necessary to use more than one energy balance apparatus as illustrated by the energy balance system of FIG. 1.

It will be understood that the foregoing description is of preferred exemplary embodiments of this invention and that the invention is not limited to the specific form shown. For example, different style cams and cam followers may be used, different style lever arms may be used, springs other than coil springs may be used to supply the predetermined force, and the individual actuator or release mechanisms can each be combined into a single system for use at a plurality or cam locations. These and other modifications may be made in the design and arrangement of the elements without departing from the scope of the invention as expressed in the appended claims.

I claim:

1. An energy balance apparatus for use on a machine, the energy balance apparatus comprising:

a shaft which rotates about an axis and upon which a torque load is imposed;

a cam supported on the shaft for coincident rotation therewith;

a cam follower in cooperative engagement with the cam, configured to limit a twisting of the shaft when loaded in torque;

a spring loaded actuator mechanism connected to the cam follower to force the cam follower against the cam with a predetermined force load;

a release mechanism cooperating with the actuator mechanism operable to reduce the predetermined force load;

wherein the actuator mechanism is comprised of a coil spring for providing the predetermined force load and includes:

a rod having a proximal end and a distal end, the rod including a flange disposed proximate the distal end;

a bracket configured to slidably receive the proximal end of the rod, the coil spring being held between the flange and the bracket; and a lever arm connected to the cam follower and pivotably mounted about a pivot point, the proximal end of the rod being connected to the lever arm;

wherein the release mechanism is connected to the bracket and selectively moves the bracket towards the distal end of the rod to release tension in the coil spring; and further wherein the release mechanism includes a pneumatic cylinder.

2. The energy balance apparatus of claim 1, wherein the release mechanism eliminates the predetermined force load.

3. The energy balance apparatus of claim 1, wherein the actuator mechanism includes a second rod and a second coil spring.

4. The energy balance apparatus of claim 1, wherein the proximal end of the rod is connected to the lever arm intermediate the cam follower and the pivot point of the lever arm.

5. The energy balance apparatus of claim 1, wherein the proximal end of the rod is connected to the lever arm on an opposite side of the pivot point of the lever arm from the cam follower.

6. An energy balance apparatus for use on a machine, the energy balance apparatus comprising:

a shaft which rotates about an axis and upon which a torque load is imposed, causing a twisting action;

a cam supported on the shaft for coincident rotation therewith;

a cam follower in cooperative engagement with the cam, configured to limit the twisting of the shaft when loaded in torque;

a spring loaded actuator mechanism connected to the cam follower to force the cam follower against the cam with a predetermined force load and in a direction oriented to counteract the twisting of the shaft;

a release mechanism cooperating with the actuator mechanism operable to reduce the predetermined force load;

wherein the actuator mechanism is comprised of a coil spring for providing the predetermined force load and includes:

a rod having a proximal end and a distal end, the rod including a flange disposed proximate the distal end;

a bracket configured to slidably receive the proximal end of the rod, the coil spring being held between the flange and the bracket; and a lever arm connected to the cam follower and pivotably mounted about a pivot point, the proximal end of the rod being connected to the lever arm;

wherein the release mechanism is connected to the bracket and selectively moves the bracket towards the distal end of the rod to release tension in the coil spring; and further wherein the release mechanism includes a hydraulic cylinder.

7. An energy balance apparatus for reducing the torque effects of power take-off devices on a drive shaft, the drive shaft including a plurality of torque load points each of which experiences variable torque loads as the power take-off device interacts with the drive shaft at each of the torque load points, the drive shaft being twisted when influenced by the torque acting at each of the torque load points, the energy balance apparatus comprising:

a plurality of cams mounted on the drive shaft, each of the cams having a cam surface and being located at a cam location;

a plurality of cam followers, at least one of the cam followers acting against each of the cam surfaces;

an actuator connected to the cam followers to force each of the cam followers against its corresponding cam surface with a predetermined force load, wherein each of the cam surfaces is configured to counteract a twisting of the drive shaft at the corresponding cam location when a sufficient predetermined force load is applied against the cam surface; and a release mechanism connected to the actuator to release the predetermined force load, wherein the plurality of cams, the plurality of cam followers, and the actuator cooperate to reduce an overall twisting of the drive shaft;

wherein the actuator includes a plurality of actuator mechanisms, each of the actuator mechanisms being disposed proximate one of the cam locations and being connected with the cam follower acting against the cam disposed at the cam location;

each of the actuator mechanisms further including a spring which is compressed to force the corresponding cam follower against the corresponding cam surface the spring being compressed between a bracket and a pivotable lever arm to which the cam follower is attached; and wherein the release mechanism includes a plurality of individual release mechanisms, each of the individual release mechanisms cooperating with one of the actuator mechanisms, each of the individual release mechanisms including a pneumatic-cylinder connected to the bracket to move the bracket in a direction which allows the spring to expand, thereby limiting a force applied by the cam follower against the corresponding cam surface.

8. An energy balance apparatus for reducing the torque effects of power take-off devices on a drive shaft, the drive shaft including a plurality of torque load points each of which experiences variable torque loads as the power take-off device interacts with the drive shaft at each of the torque load points, the drive shaft being twisted when influenced by the torque acting at each of the torque load points, the energy balance apparatus comprising:

a plurality of cams mounted on the drive shaft, each of the cams having a cam profile and being located at a cam location;

a plurality of cam followers, at least one of the cam followers acting against each of the cam profiles, the cam profiles being configured differently from one another according to the degree of twisting of the drive shaft at a corresponding torque load point;

an actuator connected to the cam followers to force each of the cam followers against its corresponding cam profile with a predetermined force load, wherein each of the cam profiles is uniquely configured to counteract a twisting of the drive shaft at the corresponding cam location when a sufficient predetermined force load is applied against the cam profile; and a release mechanism connected to the actuator to release the predetermined force load, wherein the plurality of cams, the plurality of cam followers, and the actuator cooperate to reduce an overall twisting of the drive shaft.

9. The energy balance apparatus of claim 8, wherein the predetermined force load is applied when the drive shaft rotates and is released when the drive shaft is rotationally stationary.

10. The energy balance apparatus of claim 8, wherein the actuator includes a plurality of actuator mechanisms, each of the actuator mechanisms being disposed proximate one of the cam locations and being connected with the cam follower acting against the cam disposed at the cam location.

11. The energy balance apparatus of claim 10, wherein each of the actuator mechanisms includes a spring which is compressed to force the corresponding cam follower against the corresponding cam profile.

12. The energy balance apparatus of claim 11, wherein the spring is compressed between a bracket and a pivotable lever arm to which the cam follower is attached.

13. A method for reducing twisting of a rotatable shaft under variable torque loads due to power take-off devices, the method comprising the steps of:

determining an angular twisting of the rotatable shaft at selected radial twist points along the rotatable shaft;

forming a plurality of cams, each of the cams including a cam surface having a unique profile designed to counteract the angular twisting of the rotatable shaft at a corresponding radial twist point of the selected radial twist points when a sufficient force is properly applied to the cam surface;

attaching each of the cams to the rotatable shaft proximate one of the corresponding radial twist points; and applying the sufficient force at proper orientation against each of the cam surfaces to reduce the angular twisting of the rotatable shaft at each of the selected radial twist points during rotation of the rotatable shaft.

14. The method of claim 13, further comprising the step of selectively releasing the sufficient force against each of the cam surfaces.

15. The method of claim 14, wherein the step of applying the sufficient force includes pressing a cam follower against each of the cam surfaces by a spring.

* * * * *